United States Patent [19]

Critchfield et al.

[11] 4,226,756

[45] Oct. 7, 1980

[54] MIXTURES OF EXTENDERS AND POLYOLS OR POLYMER/POLYOLS USEFUL IN POLYURETHANE PRODUCTION

[75] Inventors: Frank E. Critchfield, South Charleston; Richard M. Gerkin, Charleston; Leslie E. Hawker, South Charleston, all of W. Va.

[73] Assignee: Union Carbide Corporation, New York, N.Y.

[21] Appl. No.: 932,638

[22] Filed: Aug. 10, 1978

Related U.S. Application Data

[62] Division of Ser. No. 703,022, Jul., 1976, Pat. No. 4,125,505.

[51] Int. Cl.$^3$ .............................................. C08K 5/06
[52] U.S. Cl. ................................. 260/33.2 R; 252/182; 526/209
[58] Field of Search ..................... 260/33.2 R; 252/182

[56] References Cited

U.S. PATENT DOCUMENTS

| Re. 28715 | 2/1976 | Stamberger | 260/30.4 R |
|---|---|---|---|
| 3,523,093 | 8/1970 | Stamberger | 260/859 R |
| 3,823,201 | 7/1974 | Pizzini et al. | 260/861 |
| 3,931,092 | 1/1976 | Ramlow et al. | 260/33.2 R |
| 3,933,937 | 1/1976 | Rhodes et al. | 260/859 R |
| 3,983,094 | 9/1976 | O'Shea | 528/44 |

FOREIGN PATENT DOCUMENTS

| 735010 | 5/1966 | Canada . |
| 785835 | 5/1968 | Canada . |
| 2265787 | 10/1975 | France . |
| 361135 | 5/1962 | Switzerland . |
| 1115151 | 5/1968 | United Kingdom . |
| 1120223 | 7/1968 | United Kingdom . |
| 1321697 | 6/1973 | United Kingdom . |
| 1412797 | 11/1975 | United Kingdom . |
| 1428737 | 3/1976 | United Kingdom . |

OTHER PUBLICATIONS

J. of Cellular Plastics, Mar./Apr., 1972 pp. 90–99, Powell et al.
Fabris, Advances in Urethane Science & Technology, vol. 3, 1974, pp. 108–129.
Hogan et al., J. of Cellular Plastics, Sep./Oct., 1973, pp. 219–225.

*Primary Examiner*—Maurice J. Welsh
*Attorney, Agent, or Firm*—Eugene C. Trautlein; Richard J. Gallagher

[57] ABSTRACT

The invention provides a polyol-chain extender mixture consisting of (1) a poly(oxypropylene-oxyethylene) polyol having a hydroxyl number of from about 20 to 60, an oxyethylene cap of from about 10 to 30 weight percent and an internal oxyethylene content of from about 30 to 60 weight percent and (2) ethylene glycol, The invention also provides polymer/polyoly-chain extender mixtures wherein the polyol-chain extender is as aforesaid.

2 Claims, No Drawings

MIXTURES OF EXTENDERS AND POLYOLS OR POLYMER/POLYOLS USEFUL IN POLYURETHANE PRODUCTION

This is a division of Ser. No. 703,022 filed July 6, 1976, now U.S. Pat. No. 4,125,505.

RELATED APPLICATIONS

Priest et al., Ser. No. 417,787, filed: Nov. 20, 1973, for: Polymer/polyols and Process for Production Thereof, a continuation-in-part of Ser. No. 176,317, filed: Aug. 30, 1971, now abandoned.

BACKGROUND OF THE INVENTION

This invention relates to polyurethanes and, more particularly, to polyurethane elastomers prepared from polymer/polyols containing high ethylene oxide polyols and to the polyols themselves.

Polyurethane elastomers are used in a wide number of applications, ranging from shoe soles to automobile fascia. In a number of such applications, providing the necessary physical properties requires use of substantial amounts of low molecular weight chain extenders.

Unfortunately, such chain extenders are compatible in only unsatisfactorily low amounts with conventional polypropylene oxide-based polyols, which contain only a minor amount of ethylene oxide, typically as a cap to provide the percentage of primary hydroxyl groups desired, as is known, for the proper reactivity. This incompatibility can be tolerated to some extent, and users typically may add such extenders in amounts up to about 100% or even more by weight or so in excess of the compatible amount. However, the processing problems and limitations created are significant. Thus, bulk shipments and/or storage for even short periods of time is not economically feasible due to the resulting phase separation of the polyol and the chain extender. And, even in use, processing requires appropriate mixing to prevent phase separation. Moreover, the physical properties of the resulting elastomers may sometimes prove unsatisfactory due to, for example, marginal mixing.

Attempts have been made to develop suitable chain extenders that would be compatible in relatively large amounts of such polyols. One technique to enhance the compatibility of chain extenders has been capping polypropylene oxide-based polyols with substantial amounts of ethylene oxide.

The use of such high ethylene oxide capped, propylene oxide-based polyols makes the preparation of polymer/polyols difficult, if not impossible, by presently used techniques. This significantly restricts the utilization of such polyols in elastomer applications because the utilization of polymer/polyols is often needed to allow the preparation of elastomers with satisfactory physical properties, particularly modulus characteristics. The modulus values provided by the polyols themselves are often inadequate.

It is accordingly an object of the present invention to provide highly reactive polymer/polyols which have enhanced compatibility characteristics for low molecular weight chain extenders yet which can be readily prepared.

Another object provides a polymer/polyol-chain extender package which may be stored for extended periods of time without phase separation.

Yet another object lies in the provision of polymer/polyols capable of being converted to elastomers possessing satisfactory physical properties.

A still further object of this invention is to provide elastomers having satisfactory hydrolytic stability.

Yet another object provides polymer/polyols capable of being processed by reaction injection molding techniques with satisfactory and, in some instances, superior demolding characteristics.

Still another object lies in the provision of polyols which can be utilized to prepare polymer/polyols and elastomers having the above-described properties.

Another object of this invention is to provide polyols characterized by self-emulsifying properties when incompatible amounts of certain low molecular weight chain extenders are added.

Other objects and advantages of the present invention will become apparent from the following detailed description.

While the invention is susceptible to various modifications and alternative forms, there will herein be described in detail the preferred embodiments. It is to be understood, however, that it is not intended to limit the invention to the specific forms disclosed. On the contrary, it is intended to cover all modifications and alternative forms falling withing the spirit and scope of the invention as expressed in the appended claims.

SUMMARY OF THE INVENTION

In general, the present invention is predicated on the discovery that suitable polymer polyols possessing satisfactory compatibility with low molecular weight chain extenders can be provided by utilizing poly (oxypropylene-oxyethylene) polyols of high ethylene oxide content. The distribution of ethylene oxide in the polyol as well as the amount thereof are essential in providing elastomers with the desired properties. Conceptually, in accordance with the present invention, a portion of the ethylene oxide is present as a cap; and the remainder is distributed internally in the polyol chain. Such polyols can also tolerate incompatible amounts of certain low molecular weight chain extenders without creating processing problems because the resulting mixture exhibits self-emulsifying properties. Elastomers formed from such polymer/polyols have unexpectedly satisfactory hydrolytic stability.

DETAILED DESCRIPTION OF THE INVENTION AND PREFERRED EMBODIMENTS

Insofar as the polyol constituent is concerned, the total ethylene oxide content used depends, in a functional sense, upon the amount of chain extender which is required to provide the necessary elastomer physical properties for the particular end use application. Thus, in general, the higher the ethylene oxide content, the better the enhancement of chain extender compatibility. For most applications, the total ethylene oxide should be in excess of about 15% by weight, based upon the total weight of the polyol. Polyols containing ethylene oxide contents up to 50% will prove advantageous in use. Indeed, for some applications, it may prove useful to utilize polyols containing up to 60 to 80 or even 90% ethylene oxide.

In accordance with the present invention, the distribution of the ethylene oxide content present in the polyol must be carefully determined. It is preferred to incorporate as much of the ethylene oxide internally in the polyol chain as possible for reasons which will be discussed hereinafter. However, as is known, it is desirable to utilize polyols in the preparation of polyurethane products which have a relatively large percentage of primary hydroxyl groups to provide adequate reactivity. Accordingly, it is thus desirable to utilize polyols containing at least about 65 to 70% primary hydroxyl groups. To achieve these levels, it will therefore be necessary to, as a minimum, utilize about 10 to 15% ethylene oxide as a cap for the polyol. If a higher percentage of primary hydroxyl groups will be required for processing, higher contents of ethylene oxide may certainly be employed. However, there is an upper useful limit since formation of stable polymer/polyols with relatively high ethylene oxide caps often proves difficult, if not impossible. For this reason, the polyol must generally contain a cap of less than 35% ethylene oxide; a cap of about 30% is believed to be the practical upper limit. However, due to the borderline stability properties achieved with a polyol having a 30% ethylene oxide cap and due to other considerations which will be discussed hereinafter, it is preferred to utilize an ethylene oxide cap of no more than about 20%.

Also, and as will be discussed hereinafter, the extent of the cap verses internal ethylene oxide will likewise be determined by the hydrolytic stability required and the extent of solubilizing needed for the particular end use application. Thus, it has been found that the compatibility of chain extenders is somewhat enhanced when the ethylene oxide is present as a cap rather than being internally located. On the other hand, and in accordance with the present invention, hydrolytic stability will be enhanced if the ethylene oxide content is located internally. Accordingly, to achieve optimum overall properties, it will generally be preferred to utilize an ethylene oxide cap in the range of about 15 to 20%. The remainder of the ethylene oxide needed for compatibility will be located internally. Typically, as a minimum, the amount of internal ethylene oxide should be about 5%. For many applications, it will be desirable to use amounts in the range of 30 to 35%; but amounts up to 60% may be employed if desired.

The portion of internal ethylene oxide may be randomly located in the polyol chain or it may be present as one or more blocks. It is, however, preferred to distribute the ethylene oxide content randomly in the polyol chain inasmuch as this is believed to provide better hydrolytic stability than is obtained when the internal ethylene oxide is present as a block.

The preparation of the polyols can be carried out in accordance with well-known techniques comprising the reaction of the polyhydric starter being employed and the propylene and ethylene oxides in the presence of an oxyalkylation catalyst. Usually, the catalyst is an alkali metal hydroxide such as, for example, potassium hydroxide. The oxyalkylation of the polyhydric initiator may be carried out at temperatures ranging from about 90° C. to about 150° C. and usually at an elevated pressure up to about 200 p.s.i.g., employing sufficient amounts of the propylene and ethylene oxides and adequate reaction time to obtain a polyol of the desired molecular weight which is conveniently followed during the course of the reaction by standard hydroxyl number determinations. Depending upon whether random or block distribution is desired, the ethylene and propylene oxide reactants may be fed to the reaction system sequentially to provide chains containing respective blocks of the different oxyalkylene units or they may be fed simultaneously to provide substantially random distribution.

Any suitable di- or tri- or even higher functionality polyhydric initiator may be employed. As illustrative examples, when forming diols, propylene glycol, water, ethylene glycol, 1,3-propanediol, dipropylene glycol, diethylene glycol or the like can be utilized. For the preparation of triols, glycerin, trimethylolpropane or the like may advantageously be employed. Other useful initiators are well-known in the art.

The hydroxyl number of the polyols for preparing the elastomers of the present invention may vary from about 20 to about 60. As is known, selection of the functionality and the hydroxyl number of the polyols will determine the molecular weight of the resulting polyol.

As used herein, the hydroxyl number is determined by, and defined as, the number of milligrams of potassium hydroxide required for the complete neutralization of the hydrolysis product of the fully acylated derivative prepared from one gram of polyol or mixture of polyols. The hydroxyl number is also defined by the following equation which reflects its relationship with the functionality and molecular weight of the polyol reactant:

$$OH = (56.1 \times 1000 \times f/M.W.)$$

wherein
 OH = hydroxyl number of the polyol;
 f = average functionality, that is, average number of hydroxyl groups per molecule of polyol; and
 M.W. = average molecular weight of the polyol.

It has also been noted that the poly (oxypropyleneoxyethylene) polyols of high ethylene oxide content described herein have higher functionality than would be predicted on the basis of their hydroxyl numbers. Conventional polypropylene oxide-based polyols will usually exhibit decreasing functionality as the hydroxyl number is decreased. The higher functionalities noted herein are believed due to the higher ethylene oxide concentration used during preparation of the polyol. Maintaining a higher average functionality may prove desirable in some end use applications for flex-fatigue resistance, creep, stress relaxation, and cold flow.

As is known, the polymer/polyols may be prepared by polymerizing the vinyl monomer or monomers desired in situ in the polyols described herein. Any vinyl monomer may be used, and useful monomers are described in various prior patents, including U.S. Pat. Nos. 3,304,273 and 3,383,351 to Stamberger. It is, however, desirable for most applications to use acrylonitrile, with or without a comonomer or comonomers. The particular monomer system employed will be dependent upon the product characteristics desired in the resulting elastomer. Where high temperature requirements are involved, for example, it has been found particularly desirable to utilize an all acrylonitrile polymer/polyol. In other applications, it may be desirable to use acrylonitrile/styrene systems in which the acrylonitrile/styrene ratio may vary from about 100/0 to about 0/100. Methylmethacrylate, vinyl acetate, ethyl acrylate and acrylic acid are further useful vinyl monomers which may be employed. In some situations, it may even be desirable to employ acrylonitrile/styrene/other comonomer (e.g.—methylmethacrylate) monomer systems.

The polymer content of the polymer/polyols will vary within wide limits, depending upon the requirements of the end use application. Thus, satisfactory properties may be achieved using as little as about 5% by weight or so. On the other hand, it may be necessary to utilize polymer contents as large as can be employed to make stable product, in which case the polymer content may well be up to 40% or even up to about 60%. For most elastomer applications, where an all acrylonitrile polymer/polyol system is employed, a polymer content of from about 10 to about 25% will prove useful. Where comonomers are employed, the polymer contents will generally and desirably be somewhat higher.

It should also be appreciated that the polymer/polyol may be blended with any desired polyol to reduce the polymer content to the required level for the particular application. Indeed, blending will generally be preferred when relatively low amounts of polymer content (e.g.—about 10% or less) are needed due to the economic penalty involved in forming polymer/polyols with such relatively low polymer content initially. It should, however, be appreciated that the polyol used for blending will affect the compatibility; and it will therefore be desirable to select the polyol with this in mind. For this reason, where relatively high compatibility is necessary, it is preferred to use the poly (oxypropyleneoxyethylene) polyols described herein where blending is desired.

The techniques for preparing polymer/polyols are well-known, and any known technique may be employed. The polymer/polyols of the present invention are preferably produced by utilizing the process set forth in the copending Priest application, identified hereinbefore. In accordance with that process, a low monomer to polyol ratio is maintained throughout the reaction mixture during the process. This is achieved by employing process conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

The temperature range is not critical and may vary from about 100° C. to about 140° C. or perhaps greater, the preferred range being from 115° C. to 125° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those attained using a back mixed reactor (e.g.—a stirred flask or stirred autoclave). Reactors of this type keep the reaction mixture relatively homogeneous and so prevent localized high monomer to polyol ratios such as occur in certain tubular reactors, (e.g.—in the first stages of "Marco" reactors when such reactors are operated with all the monomer added to the first stage).

For reasons which are not fully understood, the preparation of polymer/polyols having ethylene oxide both internally and as a terminal cap is much more facile than the preparation of polymer/polyols using polyols having relatively large ethylene oxide caps. Indeed, when the latter types are employed, rapid fouling of the reaction vessel can often occur.

Any of the known low molecular weight chain extenders may be utilized in forming the elastomers of the present invention. The present invention is particularly useful with conventional glycol extenders, and it is further preferred to use either 1,4-butanediol or ethylene glycol. Other representative glycols useful as chain extenders include the following: 1,6-hexanediol; 1,5-pentanediol; 1,3-propanediol and diethylene glycol. The invention is also applicable to conventional alkanolamine low molecular weight chain extenders such as, for example, N-(2-hydroxyethyl) piperazine and monoethanolamine. While the present invention is particularly useful with chain extenders which are not compatible in acceptable amounts, it should be appreciated that the invention is equally applicable to use with chain extenders which are already satisfactorily compatible such as, for example, diamine extenders.

The extent of compatibility for the chain extender is taken as the point at which haze initially becomes visually detectable, as will be discussed in more detail in the Examples. The maximum compatibility can be determined with the base polyol selected; however, a will be appreciated, the compatibility of the chain extender is decreased in direct proportion to the polymer content of the polymer/polyol.

The amount of the chain extender employed, will, of course, vary over a wide range, depending upon the physical property requirements of the elastomer for the particular end use application. In accordance with the present invention, when using polymer/polyols as described herein, amounts up to a maximum of about 50 weight percent or more, based upon the weight of the polyol, of the butanediol are compatible with the polyols used herein while ethylene may be compatibly employed in amounts up to about 18 weight percent or more, again based upon the weight of the polyol.

In accordance with one aspect of the present invention, the chain extender in compatible amounts is blended with the polymer/polyol to provide a resin package which may be stored for extended periods of time without phase separation. The advantages of such a resin package are apparent. Thus, for example, an end user can now maintain an inventory of the desired resin package needed to produce a particular type of elastomer product which can be stored and then utilized without any mixing or other pre-use steps, e.g. - from bulk storage tanks through transfer lines to the urethane intermediates dispensing machine.

In addition, while the polymer/polyols of the present invention will typically have a sufficient solubilizing effect for the chain extenders, it should be noted that amounts in excess of the compatible limit can be utilized if desired. The flexibility provided should be apparent. Thus, using conventional polyols having relatively little solubilizing effect, it is possible to handle up to about 100 weight percent or so chain extender over the compatible limit. Such excessive amounts (i.e.—incompatible) of chain extender over the compatible limit of the chain extenders may also be employed with the polymer/polyols of the present invention. However, in view of the significant solubilizing properties of the polymer/polyols of the present invention, the handling problems associated with grossly incompatible systems should be minimized. Thus, the amount of chain extender which can be compatibly added in accordance with this invention will be more than ample to provide the requisite hardness and other property characteristics for the resulting elastomers for most end use applications.

As has been pointed out, it will generally be desirable to use the polyols of the present invention to form polymer/polyols so that the resulting elastomers will have enhanced modulus characteristics. However, where applications do not require the modulus characteristics achievable through use of polymer/polyols, it should be appreciated that elastomers can be formed directly from the base polyol itself.

In accordance with a further aspect of this invention, it has been found that the poly (oxypropylene-oxyethylene) polyols of high ethylene oxide content exhibit a self-emulsifying property when incompatible amounts of ethylene glycol are added. While the addition of incompatible amounts of ethylene glycol forms a hazy mixture, no phase separation will result until about 25 to 30 weight percent or so in excess of the compatible amount is added. This is in contrast to the case when incompatible amounts are added to a polyol having only an ethylene oxide cap. This same effect has not been observed with butanediol but may perhaps be seen when other low molecular weight chain extenders are used.

It should also be appreciated that the chain extender may be added at any time in the elastomer preparation sequence. Desirably, for example, the chain extender may be added directly to the polymer/polyol, typically prior to use in view of their superior storage stability. Alternatively, in-line blending may be employed.

The polyurethane elastomers of the present invention may be produced by reacting: (a) a polyol or polymer/polyol composition of this invention, (b) the desired low molecular weight chain extender, (c) an organic polyisocyanate and (d) a catalyst for the reaction of (a) and (b) with (c) to produce the polyurethane.

The organic polyisocyanates that are useful in producing polyurethanes in accordance with this invention are organic compounds that contain at least two isocyanato groups. Such compounds are well-known in the art of producing polyurethanes. Suitable organic polyisocyanates include the hydrocarbon diisocyanates, (e.g., the alkylene diisocyanates and the arylene diisocyanates) as well as known triisocyanates. As examples of suitable polyisocyanates one can mention 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis (3-isocyanatopropyl) ether, bis (3-isocyanatopropyl) sulfide, 1,7-diisocyanatoheptane, 1,5-diisocyanato-2, 2-dimethylpentane, 1,6-diisocyanato-3-methoxyhexane, 1,8-diisocyanatooctane, 1,5-diisocyanato-2, 2,4-trimethylpentane, 1,9-diisocyanatononane, 1,10-diisocyanato-propyl) ether of 1,4-butylene glycol, 1,11-diisocyanatoundecane, 1,12-diisocyanatododecane bis (isocyanatohexyl) sulfide, 1,4-diisocyanatobenzene, 2,4-diisocyanatototluene, 2,6-diisocyanato tolyene, 2,4-diisocyanato-1-chlorobenzene, 2,4-diisocyanato-1-nitrobenzene, and 2,5-diisocyanato-1-nitrobenzene and mixtures thereof. Still other useful examples include 4,4' diphenylmethane diisocyanate, 1,5 naphthalene diisocyanate, isophorone diisocyanate and 1,4 xylene diisocyanate. Yet additional useful examples are the modified liquid MDI-type isocyanates described in U.S. Pat. No. 3,384,653 and various quasi prepoymers as described in the following U.S. Pat. Nos. 3,394,164; 3,644,457; 3,457,200 and 3,883,571.

The catalysts that are useful in producing polyurethanes in accordance with this invention include: (a) tertiary amines such as bis (dimethylamino ethyl) ether, trimethylamine, triethylamine, N-methylmorpholine, N-ethylmorpholine, N, N-dimethylbenzylamine, N, N-dimethylethanolamine, N, N, N', N'-tetramethyl-1, 3-butanediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetone-imine, bis-acetylacetonealkylene-diimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N, N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g. dibutyltin diacetate, dibutyltin dilaurate, dibutyltin maleate, dilauryltin diacetate, dioctyltin diacetate, dibutyltin-bis (4-methylaminobenzoate), dibutyltin-bis (6-methylaminocaproate), and the like. Dialkyltin mercaptides may also be utilized. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis (isopropoxide), dibutyltin-bis (2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

If desired, other additional ingredients can be employed in minor amounts in producing the polyurethane elastomers in accordance with the process of this invention. Illustrative of such additives that can be employed are: fillers; dyes; pigments; anti-oxidation agents; silicone surfactants and the like. Indeed, in accordance with yet another aspect of the present invention, the use of filled elastomers may be employed to yield extremely hard elastomers. Thus, for example, where a particular end use application requires a relatively high Shore D hardness, rather than utilizing excessive amounts of chain extender, the formulation could include suitable amounts of any conventional modulus enhancing filler material to yield an elastomer with that hardness.

Also, some applications require a blown rather than a solid elastomer. Thus, some applications might find a density of 20 pounds per cubic foot or even less desirable. In such instances, blown elastomers can be produced by conventional techniques. This may be thus accomplished by employing a small amount of a polyurethane blowing agent, such as water, in the reaction mixture, or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide, and the like. The quantity of blowing agent employed will vary with factors such as the density required in the blown product.

If a surfactant is employed, a minor amount in the range of up to about 5 parts by weight per 100 parts by weight of the polymer/polyol reactant will typically be satisfactory. The use of a surfactant may be desired, for example, to enhance the development of a more uniform cell size. Any organosilicone or silicone-free, organic surfactant may be utilized.

The elastomers of the present invention may be formed into the desired final product by any of the known techniques. As an illustrative example, when forming automobile fascia, it is preferred to prepare the elastomers using the technique known as reaction injection molding or liquid reaction molding. This technique is described in *Rubber Age*, Volume 7, page 46, 1975. Indeed, when using the polymer/polyols of the present invention in such technique, it has been found that demolding times as low as 15 seconds per part can suitably be accomplished. This is in contrast to the 60 seconds or so demolding time typically required in present commercial applications.

In addition, the elastomers of the present invention have been found to possess hydrolytic stability which is surprising in view of the high ethylene oxide content. Thus, an elastomer formed using a polyol having a 15% ethylene oxide cap and about 35% internal ethylene oxide exhibits hydrolytic stability which is not significantly lower than that possessed by an elastomer formed with a polyol having only a 15% ethylene oxide cap. The reasons for this surprising stability are not fully understood.

The following Examples are illustrative, but not in limitation, of the present invention.

DEFINITIONS

As used in the Examples appearing hereinafter, the following symbols, terms and abbreviations have the indicated meanings:
"E.O." denotes ethylene oxide.
"Calc." denotes calculated.
"Azo" denotes 2,2'-azobisisobutyronitrile.
"Wt." denotes weight.
"Gm/hr" denotes grams/hour.
"TBPO" denotes t-butyl per-2-ethylhexoate.
"TMSN" denotes tetramethylsuccinonitrile.
"Psi" denotes pounds per square inch.

PROPERTIES

Filterability

The maximum polymer content (or maximum monomer content in the feed) for any given polyol and acrylonitrile to styrene or other comonomer ratio is that polymer content or monomer content, above which the resulting product will not essentially and completely (over 99 wt.%) pass through a 700-mesh screen under standard conditions. These standard conditions include diluting the sample (470 grams) of polymer/polyol with anhydrous isopropanol (940 grams) to remove any viscosity-imposed limitations and using a fixed quantity of material in relation to a fixed cross-sectional area of screen (2.4 sq. in.) such that about 200 grams of product are passed through a 700-mesh screen per one square inch of screen. There will generally always be a trace of solid material left on the screen after a test, but these solids amount to less than a few hundred parts per million and generally considerably less than 100 ppm after being washed free of polyol with isopropanol and dried. The 700-mesh screen is made with a Dutch twill weave. The actual screen used had a nominal opening of 30 microns and is described in Bulletin 46267-R of the Ronningen-Petter Company of Kalamazoo, Michigan. The difference between the final and initial screen weights corresponds to the amount of polymer that did not pass through the screens. The 150-mesh screen has a square mesh with average mesh opening of 105 microns, and it is a "Standard Tyler" 150 square mesh screen.

Centrifugible Solids

The polymer/polyol composition is centrifuged for about 24 hours at about 3000 revolutions per minute and 1470 radial centrifugal "g" force. The centrifuge tube is then inverted and allowed to drain for 4 hours. The non-flowing cake remaining at the bottom of the tube is reported as wt. percent of the initial weight of the composition tested.

Shore Hardness

ASTM D-2240

100% Modulus, Tensile Strength and Elongation

ASTM D-412

Die "C" Tear

ASTM D-624

Flex Modulus

ASTM D-790

Sag

The amount a sample 1 inch wide with a 4 inch cantilever droops when heated in an oven for 60 minutes at 250° F.

EXAMPLES 1-18

These Examples illustrate the effect of the ethylene oxide content and distribution in the polyol on the compatibility of chain extenders.

The compositions of the polyols used were as follows:

Example 1

A 28 hydroxyl number glycerine started polyoxypropylene triol with an acid number of 0.07 mg KOH/g and a water content of 0.07%.

Example 2

A 27 hydroxyl number, glycerine started, polyoxypropylene/polyoxyethylene triol in which the ethylene oxide was incorporated as a 15 weight percent cap. This polyol had an acid number of 0.05 mg KOH/g and a water content of 0.07%.

Example 3

A 27.7 hydroxyl number, glycerine started, polyoxypropylene/polyoxyethylene triol in which 25 weight percent of ethylene oxide was incorporated as a mixed feed in the polyol backbone and an additional 15 weight percent was added as a cap. The polyol had an acid number of 0.008 mg KOH/g and a water content of 0.036%.

EXAMPLE 4

A 28.2 hydroxyl number, a glycerine started polyoxypropylene/polyoxyethylene triol in which 35 weight percent of ethylene oxide was incorporated as a mixed feed in the polyol backbone and an additional 15 weight percent was added as a cap. The polyol had an acid number of 0.006 mg KOH/g and a water content of 0.002%.

EXAMPLE 5

A 34 hydroxyl number, glycerine started, polyoxypropylene triol with an acid number of 0.1 mg KOH/g on a water content of 0.07%.

EXAMPLE 6

A 34 hydroxyl number, glycerine started polyoxypropylene/polyoxyethylene triol in which the ethylene oxide was incorporated as a 15 weight percent cap. The polyol had an acid number of 0.02 mg KOH/g and a water content of 0.07%.

Example 7

A 33.4 hydroxyl number, glycerine started polyoxypropylene/polyoxyethylene triol in which ethylene oxide was incorporated as a 20 weight percent cap. The polyol had an acid number of 0.006 mg KOH/g and a water content of 0.013%.

Example 8

A 34.0 hydroxyl number, glycerine started polyoxypropylene/polyoxyethylene triol in which ethylene oxide was incorporated as a 30 weight percent cap. The polyol had an acid number of 0.006 mg KOH/g and a water content of 0.055%.

Example 9

A 34.9 hydroxyl number, glycerine started polyoxypropylene/polyoxyethylene triol in which ethylene oxide was incorporated as a 35 weight percent cap. The polyol had an acid number of 0.005 mg KOH/g and a water content of 0.027%.

Example 10

A 34 hydroxyl number glycerine started polyoxypropylene/polyoxyethylene triol in which 35 weight percent ethylene oxide was incorporated as a mixed feed in the polyol backbone.

Example 11

A 28.8 hydroxyl number glycerine started polyoxypropylene/polyoxyethylene triol in which 15 wt. percent E.O. was incorporated as an internal block and 35 wt. percent E.O. was incorporated as a mixed feed with propylene oxide. The polyol had an acid number of 0.007 mg KOH/g and a water content of 0.017 percent.

Example 12

A 19.9 hydroxyl number glycerine started polyoxypropylene/polyoxyethylene triol in which 35 wt. percent ethylene oxide was incorporated as a mixed feed in the polyol backbone and an additional 15 wt. percent ethylene oxide was added as a cap. The polyol had an acid number of 0.007 mg KOH/g and a water content of 0.11 percent.

Example 13

A 56 hydroxyl number, propylene glycol started, polyoxypropylene diol with an acid number of 0.1 mg KOH/g and a water content of 0.1%.

Example 14

A 57 hydroxy number, propylene glycol started polyoxypropylene/polyoxyethylene diol in which the ethylene oxide was added as a 30 weight percent cap. The polyol had an acid number of 0.005 mg KOH/g and a water content of 0.011%.

Example 15

A 40 hydroxyl number, propylene glycol started, polyoxypropylene/polyoxyethylene diol in which the ethylene oxide was added as a 15 weight percent cap. The polyol had an acid number of 0.02 mg KOH/g and a water content of 0.07%.

Example 16

A 38 hydroxyl number, propylene glycol started, polyoxypropylene/polyoxyethylene diol in which 50 weight percent ethylene oxide was added as a mixed feed.

Example 17

A 27.8 hydroxyl number, propylene glycol started polyoxypropylene/polyoxyethylene diol in which 20 weight percent ethylene oxide was added as a cap. The polyol had an acid number of 0.007 mg KOH/g and a water content of 0.017%.

Example 18

A 28.1 hydroxyl number, propylene glycol started, polyoxypropylene/polyoxyethylene diol in which 30 weight percent ethylene oxide was added as a cap. The polyol had an acid number of 0.005 mg KOH/g and a water content of 0.017%.

The compatibility of butanediol and ethylene glycol in the polyols was determined by measuring the amount of each extender which could be incorporated into the polyol before haziness developed. Fifty grams of polyol at ambient temperatures were placed in a small container. One gram of the extender was added, and the container was gently tumbled to mix the components. After mixing, the mixture was observed for haze formation. If no haze was visually evident, the process was repeated until haze was visually evident. This point was taken as the solubility limit of the extender in the polyol. The results are set forth in Table I:

TABLE I

| Example No. | | Weight Per Cent | |
|---|---|---|---|
| Triols | | Butanediol | Ethylene glycol |
| 1 | No EO | 3.5 | 1.5 |
| 2 | 15% EO Cap | 10 | 6.0 |
| 3 | 15% EO Cap + 25% EO Mixed Feed | 17.2 | 10.6 |
| 4 | 15% EO Cap + 35% EO Mixed Feed | 22.5 | 13.8 |
| 5 | No. EO | 3.5 | 1.5 |
| 6 | 15% EO Cap | 10.0 | 6.0 |
| 7 | 20% EO Cap | 12.6 | 7.7 |
| 8 | 30% EO Cap | 15.9 | 11.1 |
| 9 | 35% EO Cap | 28 | 24 |
| 10 | 35% EO Mixed Feed | 19.3 | 10.7 |
| 11 | 15% EO Internal Block + 35% Mixed Feed | 19.3 | 11.5 |
| 12 | 15% EO Cap + 35% Mixed Feed | 9.0 | 6.0 |
| Diols | | | |

TABLE I-continued

| Example No. | | Weight Per Cent | |
|---|---|---|---|
| 13 | No EO | 6.0 | 3.0 |
| 14 | 30% EO Cap | >50 | 18.7 |
| 15 | 15% EO Cap | 12.5 | 5.7 |
| 16 | 50% EO Mixed Feed | >50 | 16.5 |
| 17 | 20% EO Cap | 11.9 | 7.3 |
| 18 | 30% EO Cap | 22.4 | 19.3 |

As can be seen, the trend provides increased compatibility with increasing ethylene oxide contents. A comparison of Examples 9 and 10 shows that the presence of ethylene oxide as a cap imparts somewhat improved compatibility in relation to internal ethylene oxide.

EXAMPLES 19–28

These Examples illustrate the preparation of acrylonitrile polymer/polyols using certain of the polyols described in Examples 1–18.

The results are set forth in Table II:

TABLE II

| Example No. | 19 | 20 | 21 | 22 | 23 | 24 | 25 | 26 | 27 | 28 |
|---|---|---|---|---|---|---|---|---|---|---|
| Base Polyol, from Ex. | 14 | 14 | 9 | 9 | 6 | 3 | 4 | 11 | 12 | 2 |
| Hydroxyl number, mg KOH/gm | 57.05 | 57.05 | 34.9 | 32.64 | 35.3 | 27.65 | 27.19 | 28.76 | 19.92 | 26.5 |
| Total oxyethylene content, weight % | 30.1 | 30.1 | 35.4 | 34.5 | 14 | 36.6 | 45.4 | 43.0 | 46.5 | 14.4 |
| Target amount of first E.O. Addition, wt. % | 0 | 0 | 0 | 0 | 0 | 25 | 35 | 15 | 35 | 0 |
| Type of first E.O. Addition | — | — | — | — | — | Mixed Feed | Mixed Feed | Internal Block | Mixed Feed | — |
| Target amount of final E.O. Addition, wt. % | 30 | 30 | 35 | 35 | 0 | 15 | 15 | 35 | 15 | 15 |
| Type of final E.O. Addition | Capped | Capped | Capped | Capped | Capped | Capped | Capped | Mixed Feed | Capped | Capped |
| Primary hydroxyl content, mole % | 69 | 69 | 83.0 | — | 72 | 82.0 | 73.0 | 5.0 | 85.0 | 76 |
| Functionality, by gel-bracketing technique | (Diol) | (Diol) | — | — | ≈2.6 | 2.72 | 2.60 | — | 2.53 | 2.1 |
| Apparent Number Average Molecular Weight, Calc. | 1967 | 1967 | 4754 | 5156 | 4768 | 6087 | 6190 | 5852 | 8449 | 6350 |
| Type of catalyst | AZO | TBPO | AZO | → | → | → | → | → | → | → |
| Catalyst concentration, As Is, weight % in total feed | 0.40 | 1.00 | 0.40 | 0.40 | 0.41 | 0.41 | 0.40 | 0.40 | 0.40 | — |
| Monomer + AZO content in feed, weight % | 21.17 | 21.26 | 24.36 | 24.23 | 23.4 | 20.32 | 20.04 | 19.03 | 12.03 | — |
| Polyol + TBPO feed rate, gm/hr | 2193 | 2195 | 2074 | 2076 | 2120 | 2225 | 2231 | 2259 | 2441 | — |
| Monomer + AZO feed rate, gm/hr | 589 | 592 | 668 | 664 | 646 | 568 | 559 | 531 | 334 | — |
| Product, gm/hr | 2770 | 2779 | 2736 | 2756 | 2760 | 2781 | 2762 | 2772 | 2759 | — |
| Material balance, % | 99.6 | 99.7 | 99.8 | 100.6 | 99.7 | 99.6 | 99.0 | 99.4 | 99.4 | — |
| Reaction temperature, °C. | 125 | 130 | 125 | 125 | 125 | 125 | 125 | 120 | 125 | — |
| Residual acrylonitrile, weight % | 4.67 | 5.25 | 4.07 | 3.79 | 2.16 | 3.37 | 3.78 | 3.18 | 2.93 | — |
| TMSN, weight % | 0.16 | — | 0.19 | 0.17 | 0.13 | 0.19 | 0.15 | 0.15 | 0.14 | — |
| Conversion, acrylonitrile, % | 77.7 | 75.4 | — | 84.0 | 90.6 | 83.2 | 80.9 | — | 83.0 | 75.0 |
| Stripped Product Properties | | | | | | | | | | |
| Hydroxyl number, calc., mg KOH/gm | 47.36 | 47.51 | Reactor Plugged 1.0 Hour After Start-up Reactor Plugged >1200 1.5 Hrs. 40 After Start-up 33.1 | — | 27.8 | 23.24 | 22.83 | 24.16 | 18.13 | — |
| meas., mg KOH/gm | 46.59 | 46.65 | | 25.84 | — | 22.93 | 22.70 | 24.16 | 18.57 | 23.86 |
| Water, wt. % | 0.04 | 0.04 | | 0.03 | — | 0.04 | 0.02 | 0.01 | 0.02 | 0.02 |
| Total polyacrylonitrile by calc., wt % | 16.99 | 16.73 | | 20.82 | 21.3 | 17.14 | 16.52 | 15.98 | 8.98 | 16.74 |
| Viscosity at 25° C., Hoeppler, cps | 2164 | 2816 | | — | 3240 | 3395 | 4166 | 3565 | 4654 | 3328 |
| Brookfield, cps | 2040 | 2700 | | — | — | 3250 | 4100 | — | 4260 | 3280 |
| Residual acrylonitrile after stripping, wt. % | 0.01 | 0.01 | | 0.12 | 0.02 | 0.04 | 0.02 | 0.09 | nil | 0.03 |
| Filtration hindrance, 150-mesh screen, % thru | 100 | 100 | | 100 | 100 | 100 | 100 | 100 | 100 | 100 |
| solids on screen, ppm | 14 | 4 | | 214 | 33 | 49 | 44 | 46 | 21 | |
| 700-mesh screen, time, sec. | 193 | 194 | | 343 | 312 | 356 | 437 | 435 | | |
| % thru | 100 | 100 | | 59 | 100 | 100 | 100 | 100 | 100 | |
| solids on screen, ppm | 14 | 6 | | 33 | 50 | 30 | 97 | 85 | | |
| Centrifugible solids, weight % | 34.6 | 18.4 | | 4.30 | 1.64 | 2.01 | 1.71 | 1.41 | 1.75 | |
| Acid number, mg KOH/gm | 0.05 | 0.12 | — | — | — | — | — | — | — | — |

The unsuccessful attempts to form a polymer/polyol with the polyol of Example 9 (see Examples 21 and 22), having a 35% ethylene oxide cap, demonstrate the restriction on the extent of the ethylene oxide cap which can be tolerated. In addition, as seen from Examples 19 and 20, attempts to form polymer/polyols with a diol having a 30% ethylene oxide cap form products with borderline properties.

before immersion, immediately after removal from the water and after a one week equilibration at 50% relative humidity. The results are shown in Table IV:

TABLE IV

| Physical Properties | Example 29 | | | | | Example 30 | | | | |
|---|---|---|---|---|---|---|---|---|---|---|
| | Control | Wet | % Change | 1 wk. Equil. | % Change | Control | Wet | % Change | 1 wk. Equil. | % Change |
| Hardness, Shore D | 58 | 52 | −10.3 | 58 | 0.00 | 53 | 50 | −5.6 | 55 | +3.8 |
| 1001 Modulus, psi | 2530 | 1970 | −22.1 | 2520 | 0.00 | 2070 | 1480 | −28.5 | 1037 | −6.4 |
| Tensile St., psi | 3810 | 2790 | −26.7 | 3550 | −6.8 | 3830 | 3060 | −20.1 | 3650 | 0.00 |
| Elongation, % | 273 | 227 | −16.6 | 237 | −13.2 | 273 | 307 | +12.5 | 312 | +14.3 |
| Die "C" Tear pH | 469 | 371 | −20.7 | 413 | −11.7 | 556 | 417 | −25.0 | 543 | −2.3 |
| Flex Modulus, psi | | | | | | | | | | |
| −20° F. | 52.9M | 44.3M | −16.2 | 54.7M | +3.4 | 53.9M | 44.1M | −18.2 | 59.4M | −10.2 |
| 75° F. | 26.6 | 16.6 | −37.6 | 25.7 | −3.4 | 16.9 | 8.9 | −47.3 | 15.4 | −8.9 |
| 158° F. | 13.4 | 11.2 | −16.4 | 13.6 | +1.5 | 6.9 | 6.8 | −23.5 | 8.1 | −8.9 |
| Sag (1 hr. at 250° F.) | 0.35 | — | — | 0.30 | — | 0.4 | — | — | 0.35 | — |

| Physical Properties | Example 31 | | | | |
|---|---|---|---|---|---|
| | Control | Wet | % Change | 1 wk. Equil. | % Change |
| Hardness, Shore D | 52 | 46 | −11.5 | 54 | +3.8 |
| 1001 Modulus, psi | 1890 | 1300 | −31.2 | 1760 | −6.8 |
| Tensile St., psi | 3380 | 2620 | −22.4 | 3500 | +3.5 |
| Elongation, % | 253 | 307 | +21.3 | 306 | +21.7 |
| Die "C" Tear pH | 470 | 357 | −24.0 | 469 | 0.00 |
| Flex Modulus, psi | | | | | |
| −20° F. | 51.3M | 44.2 | −13.6 | 55.9M | +3.0 |
| 75° F. | 16.0 | 6.1 | −40.3 | 13.6 | −15.0 |
| 158° F. | 8.4 | 5.9 | −29.7 | 7.2 | −11.3 |
| Sag (1 hr. at 250° F.) | 0.5 | — | — | 0.40 | — |

EXAMPLES 29-31

These Examples show the effect of water immersion on the properties of the polyurethane elastomers of the present invention in comparison to elastomers prepared with conventional polyols.

The formulations are set forth in Table III:

TABLE III

| Composition | Example 29 | Example 30 | Example 31 |
|---|---|---|---|
| Polymer/Polyol(1) | 88 | 88 | 88 |
| Ethylene glycol extender | 12 | 12 | 12 |
| Triethylenediamine(2) | 0.05 | 0.075 | 0.05 |
| Dibutyltin dilaurate | 0.4 | — | 0.02 |
| Liquid MDI, NCO Index | 102 | 102 | 104 |

(1)The polymer/polyol used in Example 29 comprises a 16 weight % polyacrylonitrile in situ polymerized in a polyol having a 15% ethylene oxide cap and Examples 30 and 31 comprise 15.5 weight % polyacrylonitrile in situ polymerized in a polyol containing a total of 50 weight % ethylene oxide, 35% being in the polyol backbone via mixed feed and 15% as a cap.
(2)33 weight % in a liquid carrier.

Each of these formulations were processed into elastomer plaques using the large machine described in the *Rubber Age* article previously identified. The thus-formed plaques were immersed in deionized water at 74° C. for one week. Physical properties were measured As can be seen, the inclusion of 35% internal ethylene oxide in the polyol has little adverse effect on the hydrolytic stability of the elastomers in comparison to the elastomer having only a 15% ethylene oxide cap.

What is claimed is:

1. A polyol-chain extender mixture consisting of (1) a poly(oxypropylene-oxyethylene)polyol having a hydroxyl number of from about 20 to 60, an oxyethylene cap of from about 10 to 30 weight percent and an internal oxyethylene content of from about 30 to 60 weight percent and (2) ethylene glycol.

2. A polymer/polyol-chain extender mixture consisting essentially of: (1) a liquid polymer/polyol composition consisting essentially of: (a) from about 40 to 95 weight percent of a poly(oxypropylene-oxyethylene)-polyol having ahydroxyl number of from 20 to 60, an oxyethylene cap of from about 10 to 30 weight percent and an internal oxyethylene content of from about 30 to 60 weight percent, and (b) from about 60 to about 5 weight percent of a polymer formed from an ethylenically unsaturated monomer, said polymer being in the form of particles that are stably dispersed in the polyol and said composition having been produced by polymerizing the monomer in the polyol, and (2) ethylene glycol.

* * * * *

UNITED STATES PATENT AND TRADEMARK OFFICE
CERTIFICATE OF CORRECTION

PATENT NO. : 4226756
DATED : October 7, 1980
INVENTOR(S) : Frank E. Critchfield et al.

It is certified that error appears in the above—identified patent and that said Letters Patent is hereby corrected as shown below:

In the ABSTRACT, antepenultimate line, for "polyoly" read --polyol--.
In column 4, line 36, for "functionality" read --functionalities--.
In column 6, line 22, for "a" read --as--.
In Table II (column 14), in Table column 22, read the text as pertaining only to the filtration hindrance rows, read 33.0 as pertaining to the centrifugible solids row, and read the dash as referring to the acid number row.
In Table IV Example 31 (column 16), in Example column Wet, for "6.1" read --8.1--.
In claim 2, fifth line, for "ahydroxy" read --a hydroxy--.

Signed and Sealed this

Seventeenth Day of March 1981

[SEAL]

Attest:

RENE D. TEGTMEYER

Attesting Officer    Acting Commissioner of Patents and Trademark